Feb. 8, 1949.   V. P. DONNER   2,461,414
FITTING FOR TRANSPARENT TUBES
Filed June 15, 1945
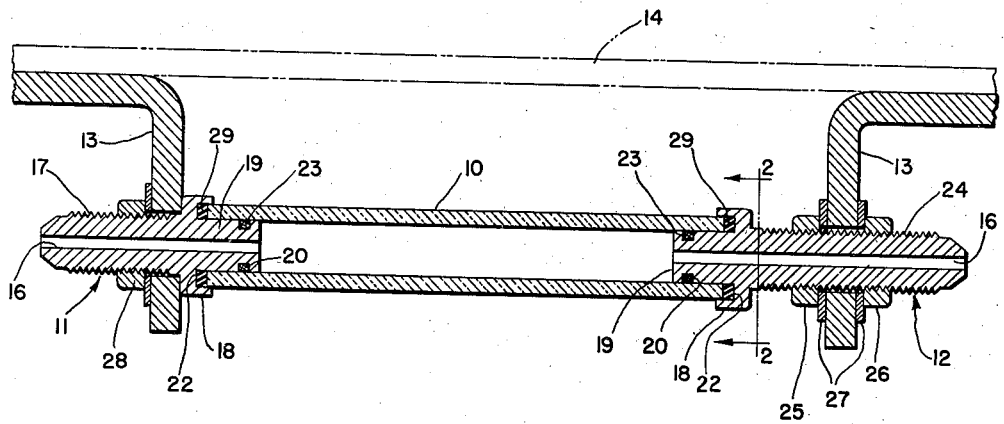
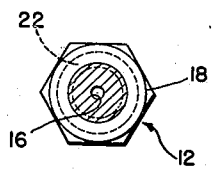
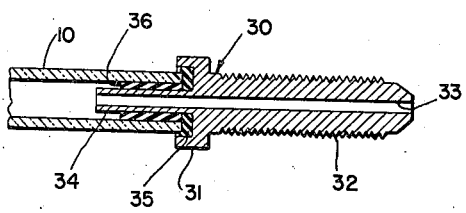
INVENTOR.
VERNE P. DONNER
BY George F. Goodyear
ATTORNEY Patented Feb. 8, 1949

2,461,414

UNITED STATES PATENT OFFICE 2,461,414

FITTING FOR TRANSPARENT TUBES

Verne P. Donner, East Aurora, N. Y., assignor to Curtiss-Wright Corporation, a corporation of Delaware Application June 15, 1945, Serial No. 599,681

8 Claims. (Cl. 285—5)

This invention relates generally to new and useful fitting means for fluid conduits and more particularly to fitting means adapted to provide a secure connection for a transparent tube section.

It is an important object of the present invention to provide a fluid conduit fitting of improved character and one that will enable the use of a transparent conduit section in a fluid system subject to extremely high pressures.

It is an object also that the improved fitting shall be capable of sealing the end connections of a transparent tube against escape of fluid and the consequent axial compressive loads exerted at the ends of the tube which may cause tube rupture.

A further object resides in the improved structural arrangement of the fitting means which enables the use of transparent tube sections at maximum pressures and permits a desirable degree of endwise movement of the tube relative to the fitting to allow for temperature effects and for other causes.

Still another object resides in the improved means for permitting insertion of a transparent tube in a high pressure fluid system and for establishing a positive seal at each end of the tube so that the system pressure may vary without adverse effect.

Other objects and advantages will be pointed out in connection with the detailed description of the invention as illustrated in the accompanying drawing in which:

Figure 1 is a longitudinal sectional elevation of the preferred form of the invention, the view showing details of assembly of a transparent tube section, Figure 2 is a transverse section taken at line 2—2 of Figure 1, and Figure 3 is a longitudinal section through a modified fitting means.

Referring now to the drawing and particularly to Figures 1 and 2 thereof the transparent fluid conduit assembly is characterized by a tube 10, cooperating end fittings 11 and 12 and suitable mounting means 13 for securing the fittings and conduit in assembly. The mounting means or brackets 13 may be conveniently secured to an adjacent structure such as that indicated in outline at 14.

The fitting 11, for example, comprises a body having a fluid conveying bore 16, a threaded shank 17, and an enlarged portion or flange 18 formed thereon intermediate the threaded shank end of the body and a cylindrical end 19, the latter having an annular recess formed therein at 20 for the reception of suitable sealing means later to be noted. The enlargement or flange 18 is provided with an annular recess 22 opening toward the end 19 for receiving the end of the tube 10. Thus the projecting cylindrical body portion which is provided with recess 20 fits into the end portion of the tube such that an O-ring packing element 23 positioned in the recess contacts the inner surface of the tube inwardly of the end zone thereby preventing fluid from escaping toward the flange 18 and acting against the end face of the tube 10.

The fitting 12, like fitting 11, is similarly provided with a fluid bore 16, an enlargement or flange portion 18 suitably recessed to receive the opposite end of the tube and a cylindrical projection 19 for cooperation in sealing the inner surface of the tube by means of an O-ring sealing element 23 carried in the recess 20 formed therein. In other respects the fitting 12 is provided with an elongated threaded shank 24 to enable its adjustment axially of the tube and with respect to its mounting means 13 such that the spacing between the fittings 11 and 12 may be adjusted to accommodate variations in the length of the interposed transparent tubular conduit 10 without imposing endwise mechanical loads thereon. Each of the fittings 11 and 12 is provided with a resilient rubber or felt-like washer 29 fitting into the flange recess 22 and against which the tube end abuts. As a consequence vibration, shock and thermal expansion or contraction of the tube will not have a detrimental effect on the tube 10.

The fitting 12 is secured in adjusted position by the cooperation of nuts 25 and 26 embracing therebetween the mounting means 13. Washers 27 may be used as is well known. Fitting 11 is preferably, but not necessarily, non-adjustably secured to its mounting means 13 by means of a holding nut 28 threaded over the shank 17 in the manner shown in Figure 1. Referring to Figure 2 it will be noted that the enlarged portion 18 of fitting 12 is suitably hexagonally formed for cooperation with an end wrench or other suitable tool utilized in its assembly. Similarly the fitting 11 has its enlarged flange portion 18 formed in a manner similar to that illustrated in Figure 2.

A modified fitting construction is illustrated in Figure 3 and as there shown comprises a body 30 having an enlarged flange portion 31 intermediate its ends, a threaded shank 32, a fluid conveying bore 33 and a reduced cylindrical projecting portion 34 which is adapted to be inserted in the end of the transparent tube section 10. The flange portion 31 is provided with a resilient element or rubber washer 35 against which the end of the tube abuts. In order to effect a positive fluid seal inwardly of the end of the tube 10 a soft rubber sleeve 36 is pressed over the projection 34 of the fitting and this sleeve is adapted to contact the inner surface of the tube to produce the desired fluid sealing effect.

In either form of the present invention it will be observed that the fitting members do not impose any axially directed mechanical forces on the transparent tube section disposed therebetween. Sole reliance for effecting a positive fluid seal is placed upon the sealing elements 23 in the form of the invention shown in Figure 1 and upon the sleeve element 36 of the fitting illustrated in Figure 3. In each case this seal is established on the inside diameter of the tube by means of the fluid pressure or force exerted on the seal ring or sleeve. Since there is no mechanical sealing at each of the fittings the elements 23 or 36 will automatically produce adequate sealing in proportion to the hydraulic force operating in the system. That is, the fluid force will cause the sealing elements to become more secure with increase of pressure.

It will also be observed that the transparent tube section is adequately cushioned at the end zones thereof for the purpose of absorbing vibrations and shocks and also for permitting thermal expansion and contraction of the tube section.

In actual practice the transparent tube assembly of the type illustrated in Figure 1 has been found to perform its intended function at pressures at least up to substantially 4500 pounds per square inch. This is believed to be considerably higher than any other type of fitting now known. The performance at such extremely high pressures is materially aided by preventing axial compression of the tube section 10. This has been accomplished by providing a positive fluid seal on the internal surface of the tube inwardly of its ends so that regardless of the hydraulic pressure existing within the tube such pressure is prevented from acting against the end walls of the tube.

It should be obvious that the present invention may be found useful in combination with a fluid flow system in which case the fittings 11 and 12 are inserted in suitable couplings (not shown). Its use as a sight glass for fluid level indicating purposes on fluid containers and the like is also readily apparent. Other uses will come to mind in view of the foregoing description of the invention. The tube section 10 may be formed of glass, plastics or other suitable and transparent material. Accordingly, this invention is not to be limited by modifications or rearrangements of the several parts except as the same may be hereinafter so limited by the annexed claims.

What is claimed is:

1. A fluid conduit fitting for use with a transparent conduit section of a high pressure fluid system, said fitting comprising a body having an enlarged portion spaced from one end and formed to provide a seat to receive the end of the conduit section, and fluid sealing means carried near said one end of the fitting body for fluid sealing engagement with the inner surface of the conduit section at a zone inwardly of the seated end thereof.

2. A fitting for use with a tube section normally subject to high pressure fluid flow sufficient to separate the tube and fitting by fluid force acting on the tube end, said fitting comprising a tubular body having a flange intermediate its ends which provides a seat for the end of the tube section, a resilient ring element between the seat and the end of the tube, and a fluid seal element carried on said body in position for engaging the tube inwardly thereof from said resilient element whereby high pressure fluid will be prevented from acting on the tube end.

3. A fitting member for a fluid tube section comprising a body formed to provide a bore communicating with the tube section, the body having an annular seat adjacent one end of the tube section and a cylindrical projection over which the end of the tube is mounted, a resilient element on said seat and against which the tube end abuts, and a seal element on said cylindrical projection for engaging the inner surface of the tube in a zone spaced from its end whereby the pressure of fluid in the tube section will be prevented from acting on the tube end to force the same away from its seat.

4. In a sight flow conduit assembly for fluid under pressure, a transparent conduit, a fitting member for each end of said conduit, each of said members comprising a body formed to provide a projection over which the tube end is positioned and a seat into which the tube end extends, and means on each said body projection for establishing a fluid seal with the inner circumferential surface of said conduit thereby preventing the escape of fluid from said conduit toward said tube end seat.

5. In a sight flow conduit assembly for fluid under pressure, a transparent conduit, a fitting member for each end of said conduit, each of said members comprising a body formed to provide a projection over which the tube end is positioned and a seat into which the tube end extends, means on each said body projection for establishing a fluid seal with the inner circumferential surface of said conduit thereby preventing the escape of fluid from said conduit toward said tube end seat, and mounting means for each of said fitting members, one of said fitting members being constructed for adjustable movement relative to its mounting means and in a direction axially of the transparent conduit.

6. In a sight flow conduit assembly for fluid under pressure, a transparent conduit, a fitting member for each end of said conduit, each of said members comprising a body formed to provide a projection over which the tube end is positioned and a seat into which the tube end extends, a resilient cushion in each of said body seats and against which the tube end abuts when in assembly, means on each said body projection for establishing a fluid seal with the inner circumferential surface of said conduit thereby preventing the escape of fluid from said conduit toward said tube end seat, and means for adjusting said fitting members relative to said conduit for preventing the imposition of endwise load on the conduit by the fitting members.

7. In assembly with a non-metallic tube, a fitting at each end of the tube comprising a tubular projection into the tube and an annular flange adjacent the tube end face, a resilient cushion between the tube end face and said annular flange, the tubular projection having an annular recess therearound spaced axially along the projection from said flange, and a sealing ring in said recess engaging the inner circumferential surface of the tube.

8. In assembly with a non-metallic transparent sight tube for a high fluid pressure system, a fitting at each end of the tube comprising a tubular projection into the tube and an annular flange adjacent the tube end face, a resilient cushion between the tube end face and said annular flange, the tubular projection having an annular recess thereabout spaced axially along the projection from said flange, and a resilient sealing ring in said recess, said ring under pressure exerted from within the tube being compressed into sealing engagement against the inner circumferential surface of the tube whereby no substantial pressure of fluid within the tube may be exerted upon the tube as a compressive force in a direction longitudinal thereof.

VERNE P. DONNER.

REFERENCES CITED

The following references are of record in the file of this patent:

UNITED STATES PATENTS

| Number | Name | Date |
|---|---|---|
| 49,366 | Belfield | Aug. 15, 1865 |
| 735,735 | Feust et al. | Aug. 11, 1903 |